Patented Oct. 13, 1925.

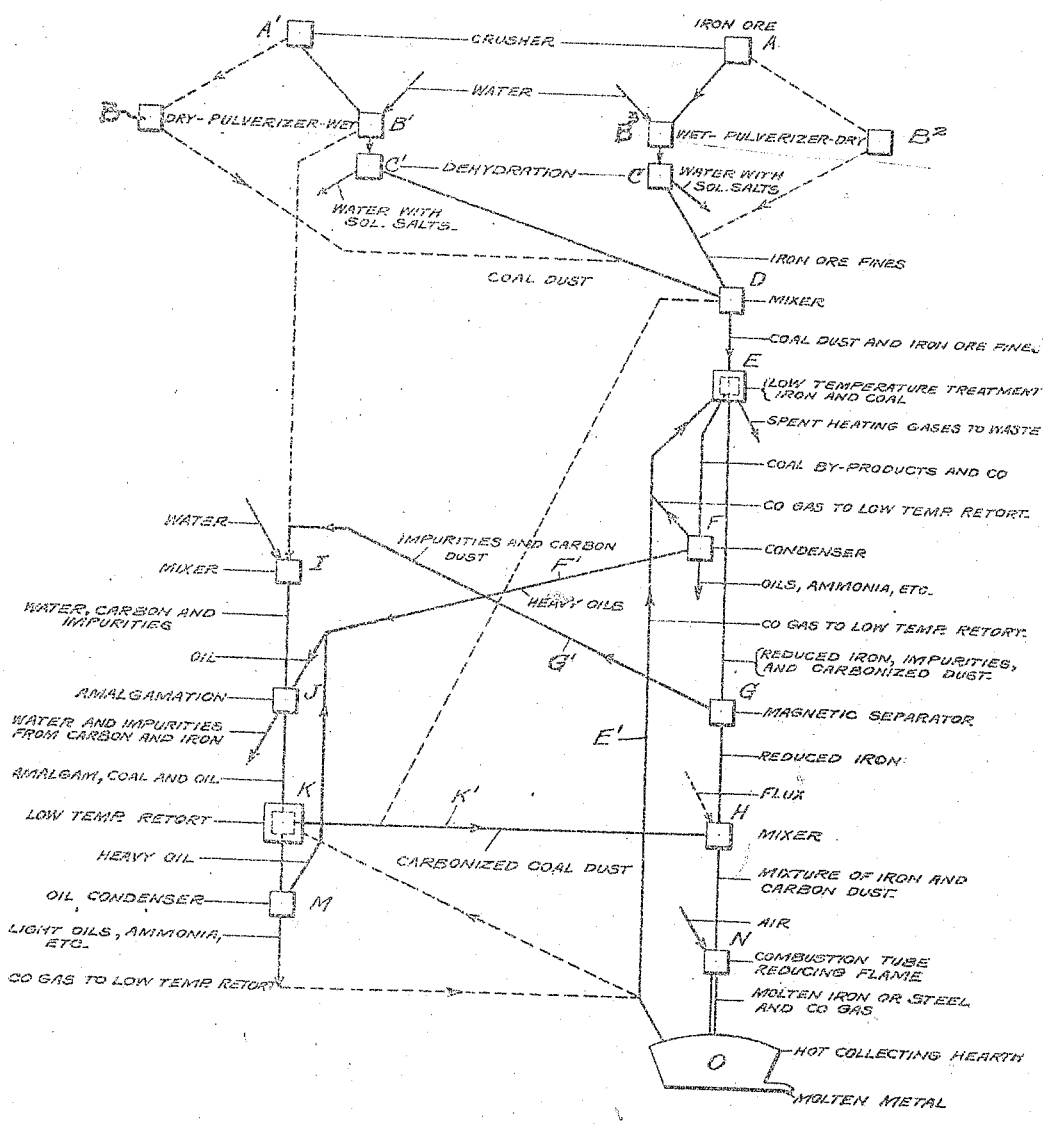

1,557,107

UNITED STATES PATENT OFFICE.

WALTER EDWIN TRENT, OF WASHINGTON, DISTRICT OF COLUMBIA, ASSIGNOR TO TRENT PROCESS CORPORATION, OF WASHINGTON, DISTRICT Of COLUMBIA, A CORPORATION OF DELAWARE.

PROCESS OF REDUCING ORES.

Application filed October 4, 1920. Serial No. 414,526.

*To all whom it may concern:*

Be it known that I, WALTER E. TRENT, citizen of the United States of America, residing at Washington, in the District of Columbia, have invented certain new and useful Improvements in Processes of Reducing Ores, of which the following is a specification.

The present invention relates to a process of reducing iron and other metallic ores to metal.

It is the object of the invention to provide a process for reducing iron ores to metal by employing a fuel such as coal and effecting a recovery of the by-products of the coal employed in reducing the iron.

It is a further object of the invention to provide a process of reducing iron and like metals at temperatures sufficiently high to reduce the iron, but at temperatures below that which causes sintering, fusing, agglomerating or slagging formation.

It is a still further object of the invention to provide a process for reducing iron and like metals by using coals and lignites from which the volatile content has been expelled.

It is also an object of the invention to remove impurities from the iron ore and from the coal before the final melting of the iron takes place. In other words, the slag forming materials are eliminated in advance of the actual final melting of the metal.

A still further object of the invention is to recover the by-products under conditions that give the maximum yields of oils. It has been found that when coal is sufficiently finely ground a maximum yield of oil can be obtained from the coal at temperatures ranging from 300-400° C., and it has also been found that very finely pulverized iron ore can be reduced in the presence of carbon at about the same temperature. Therefore, by treating coal and iron both in very finely pulverized form at about 300-400° C. several beneficial results accrue viz.: the maximum yield of oil from the coal, the reduction of the iron ore particles, and the avoidance of sintering or agglomerating or slagging the impurities on account of the low temperature. The iron particles can be completely reduced in this manner and will be recovered as metallic particles intermixed with, but not attached to, the impurities of the ore or the impurities of the coal. The metallic iron can then be separated or removed from the balance of the material by magnetic means, electrostatic means, water or oil flotation. When the iron is wanted in the form of pigs, it can be melted with the carbon and collected in a hot hearth, and when the iron is wanted in the final pig form, it is not necessary to completely reduce the iron ore in the low temperature treatment, but it is sufficient to carry the reduction only to such a point that all of the iron is magnetic. When the raw coal is mixed with the iron ore during the low temperature treatment, the water which occurs from the hydrogen content of the coal, interferes with the complete reduction of the iron. It does not interfere, however, in partly reducing the iron and making it magnetic. The low temperature treatment of the coal prepares the fuel, however, for the final reduction of the iron by driving out the volatile content of same and leaving a fixed carbon.

The process is particularly applicable to the treatment of flue dust made by all existing blast furnaces, and it contemplates the mixture of the dust with pulverized carbonaceous material and its treatment as described above.

It is, however, a feature of the process that the iron ore is pulverized by either wet or dry grinding machinery, and that the coal is likewise pulverized to mix with the ore. The process may be carried out in different manner, and as one illustration, after pulverization of the coal, if pulverized wet, dehydration is resorted to and the two substances then introduced to a mixer and then subjected to the low temperature heat treatment already described. After this heat treatment, the reduced iron, or partly reduced iron, is removed from the carbon and impurities in a separator. The carbonized particles and impurities will then be introduced to a mixer with a definite quantity of water and after which the mixture is subjected to the action of fuel oil in the ratio of approximately one part of oil to two parts of carbon by weight, which results in the formation of an amalgam of substantially pure carbon and oil, free from the other substances. The oil is delivered to the material suspended in the water from any suitable source. This purification of the carbonaceous material is carried on in a manner described in my Patent No. 1420163, granted June 20, 1922, in which the amalgam, after being formed, is subjected to distillation so as to obtain the carbon particles free of the oil used to effect its purification.

From the separator the ore is again conveyed to a mixer and there commingled with the purified and carbonized coal particles, and the mixture is introduced to a combustion tube having a reducing atmosphere in which the reduction of the iron particles is completed at melting temperatures and the iron, as it leaves the combustion tube, enters a hot collecting furnace in which the metal is collected in molten form.

The accompanying drawing represents a diagrammatical showing of a chart indicating how the process can be carried into practical use.

Referring more particularly to the drawings, wherein like reference characters indicate corresponding parts, the letter A' designates a coal receiver having a source of communication with the dry pulverizer B, and the wet pulverizer B'. A represents an ore receptacle for iron ore or the like, communicating with either the wet crusher B³ or the dry crusher B². The material from the receivers A and A' may be introduced to either a dry or wet pulverizer to undergo pulverization, a wet pulverizing having the advantage of being cheaper in operation, but dehydration must necessarily follow wet crushing, while dry crushing can only be done at a high cost, although it offers the advantage of eliminating the step of dehydration. If coal is pulverized wet, it is introduced to the dehydrator C', before delivery to the mixer D, but if dry ground, is led directly from the pulverizer to the mixer D. Various types of apparatus may be employed for dehydrating the material, and may consist of mere thickening tanks so that the materials may be settled and the water removed therefrom, carrying such impurities as soluble salts. After a reduction of the coal, which is preferably sufficiently fine to physically separate the particles of impurities from the carbonaceous content of the coal, and a similar reduction of the iron ore to detach the impurities, a charge of coal is introduced to the mixer D with a charge of iron ore with its detached impurities it being understood that if the coal is pulverized wet, it is delivered first to the dehydrator C and then to the mixer D. The entire amount of coal necessary to reduce the iron may be introduced to this mixer with the ore, while only a slight portion of the coal, sufficient to partly reduce the iron, may be conveyed to the mixer. Assuming, however, that the entire charge is introduced to the mixer, the same is commingled therein, and conveyed to the low temperature treatment chamber E, adjacent the mixer. This chamber is provided with a central retort heated by indirect heating, resulting from the burning of a fuel such as combustible gases, or the like, which may or may not be the volatile substances removed from the coal. The passage of the material through the retort causes a distillation of the coal, removing volatile gases and by-products therefrom, while the iron or like ore is partially reduced. Of course the entire charge of ore may be reduced, but the temperature of the retort is preferably maintained sufficiently low, say from 300 to 400 degrees centigrade to effect a maximum recovery of the oil from coal, and at the same time prevent a complete reduction or slagging or sintering the metal. The heat treatment is sufficient to carry the reduction only to such a point as to render iron magnetic and to enable a separation to be later effected. The distilled gases from the retort E, escape through the pipe E' to the combustion chamber N, to be later described, while the heavier volatile products of the coal pass to the condenser F where they undergo condensation, and the recovered oils are delivered through a feeding conduit F' to an amalgamator J, for purposes which will later appear. The carbonized particles and the partially reduced ore from the retort E pass on to the separator G, which may be of any convenient type, but is preferably a magnetic separator if the ore undergoing treatment is an iron ore. In this separator the partially reduced iron which has been rendered capable of separation by reason of the heat treatment, is removed from the carbonized dust with any impurities which exist, and conveyed by the pipe G' to a suitable mixer I, communicating with the amalgamator J. Water is added to this mixture with oils coming from the condenser F, or from an outside source, and the entire mass agitated to form an amalgam, excluding the impurities from the carbonaceous matter, in the manner disclosed in my copending application hereinabove mentioned. The iron from the magnetic separator G passes to a mixer H. This mixer is in communication with a low temperature retort K, receiving the amalgam of coal and oil from the amalgamator J, which amalgamated substances are distilled by the heat in the retort, and the carbonized particles introduced by the feed pipe K' to the mixer H. From this mixer substantially pure carbon dust and partially reduced iron ore are conveyed to the combustion tube N, having a reducing flame therein, resulting in the combustion of the pure carbon, with the proper manipulation of air serving to completely reduce the ore introduced to the retort. Purified carbon particles have a decided advantage over raw coal in the reduction of iron, in view of the fact that when raw coal is mixed with iron ore during a low temperature treatment the water which occurs from the hydrogen content of the coal interferes with the complete reduction of the iron, and it has likewise been found that hydrocarbons seriously impede and interfere with the complete reduction of iron ores to molten metal, which objections are not encountered when using pure carbon.

Carbon monoxide gases generated in the low temperature of the retort K may be introduced to the combustion tube N, or to the hot collecting hearth O receiving the molten iron and any carbon monoxide gases. The reduced iron is conveyed from the hearth O through a discharge pipe for any further and subsequent treatment as may be necessary. It will be understood that when iron is wanted in the form of pigs, it can be melted with the carbon and collected on the hearth. The mixture of purified iron and carbon that is introduced to the combustion tube N is in proper definite ratios, preferably 1 part carbon to 1 part iron, and the proper reducing atmosphere maintained in the tube to reduce the iron. Carbon obtained in various manners may be employed for reducing the iron, and I have merely disclosed the foregoing process of purifying coal and iron before reduction, for the purpose of illustrating a convenient means for carrying out the invention, one of the salient features of which consists in the reducing of various ores by carbon freed of its deleterious impurities. This has been found to enable the production of a superior product in a more limited time than is possible when using raw coal or even coke for reducing iron.

It is evident that combustible gases produced by this process, in either the low temperature retorts E and K, or the combustion reducing chamber N, and hot hearth O, can be used for other purposes than producing the necessary heat in the various treatment chambers, such for instance as for sale as municipal or industrial gas if this is found more profitable. Carbonized dust or other fuels can be successfully employed in the low temperature retorts E and K, while purified carbon may be employed in the combustion tube N. It should be recognized that the combustible gases produced in the low temperature retorts E and K as well as those produced in the collecting hearth chamber O, are very rich and of greater value than the ordinary gases produced in blast furnaces. This is because the gases in the low retort chamber E and K are formed while separated from the gases of combustion due to the indirect heat treatment and are therefore not diluted, while the gases generated in the hot collecting hearth O, arise from a closely regulated ratio of air and carbon dust.

Instead of mixing the entire quantity of pulverized coal with the pulverized iron ore in the mixer D, a relatively small quantity of the coal may be introduced to this mixture, sufficient only to cause a partial reduction of the iron in the low temperature retort E, while the remaining pulverized coal will be directly introduced through a suitable pipe to the mixer I to undergo a treatment in the amalgamator J, and then subjected to a heat treatment in the low temperature retort K, after which the heavy oils, light oils, ammonia, and the like, are collected by the condenser M and certain of these products introduced to the hot collecting hearth O for carrying on a reduction of the metal, while all or other of the products may be collected for other uses as may be found more profitable. If the process is carried on in this manner, then the small quantity of coal introduced to the retort E is separated from the partially reduced iron by the magnetic separator G, and this coal with its carbonaceous dust conveyed to the mixer I, and the gases removed therefrom, collected in the manner hereinbefore described.

Having thus described the invention, what I claim is:

1. The process of treating ores, which comprises mixing finely comminuted ore particles with finely divided carbonaceous fuel particles substantially freed of hydrocarbon, and in then burning the fuel particles mixed with the ore in a reducing atmosphere to reduce the ore.

2. The process of treating ores, which comprises mixing finely comminuted ore with fine particles of coal, in subjecting the mixed materials to the presence of heat to remove the volatiles from the coal and to render the ore susceptible of separation from its impurities, in separating the ore from its impurities, and in then mixing the same with the comminuted carbonaceous material substantially free of hydrocarbons, and in burning the carbonaceous fuel in the presence of the ore to reduce the same.

3. The process of treating iron ore intermixed with pulverized coal, which comprises preliminarily heating the intermixed materials to partially reduce the ore and remove the volatiles from the coal, in effecting a separation of the iron particles of the ore from its impurities, in removing the carbonized particles of the coal from non-carbonaceous matter, and in then burning the carbonized particles in the presence of the partially reduced ore to completely reduce the ore to metals.

4. The process of treating iron ore, which comprises mixing the ore in a comminuted condition with finely pulverized carbonaceous fuel freed of its hydrocarbon, and in burning the fine fuel in the presence of the fine ore in a reducing atmosphere to reduce said ore.

5. The process of treating iron ore intermixed with pulverized coal, which consists in subjecting the mixed substances to a heat treatment to remove the volatiles from the coal and place the ore in a condition to permit a subsequent separation of the ore from its impurities, in separating the ore from its impurities, and in then mixing the partially reduced purified ore with the carbonaceous fuel freed of its volatiles to be burned in a reducing atmosphere to reduce the ore.

6. The process of treating iron ore intermixed with pulverized coal, which consists in subjecting the mixed substances to a heat treatment to remove the volatiles from the coal and place the ore in a condition to permit a subsequent separation of the ore from its impurities, in separating the ore from impurities and the carbon particles of the coal from gangue, and in then mixing the purified carbonized particles with the partially reduced ore to be burned in the presence of the ore in a reducing atmosphere to completely reduce the ore.

7. The process of treating iron ore mixed with pulverized coal, which consists in subjecting the mixed comminuted substances to an indirect heat treatment to partially reduce the ore and remove volatiles from the comminuted coal, in effecting a separation of the ore from impurities, and the carbonized particles of the coal from non-carbonaceous matter, and in then reducing the ore by mixing the same with the purified carbonized particles to be burned in the presence of the ore in a reducing atmosphere.

8. The process of treating iron ore mixed with pulverized coal to reduce the same, which consists in subjecting the mixed substances to a heat treatment to remove the volatiles from the coal and to partially reduce the ore, in effecting a magnetic separation of the ore from impurities, in collecting the carbonized particles and non-carbonaceous matter of the coal, in applying an agent to said substances to separate the carbonized particles from impurities, and in then utilizing the carbonized particles for a fuel to be burned in the presence of the purified atmosphere to reduce the ore.

9. The process of treating ores, which consists in finely comminuting an ore, in comminuting coal to a fine state of division, in intermixing the comminuted materials, in subjecting the aggregate to a heat treatment to partially reduce the ore and to remove the volatiles from the coal, in separating the ore from its impurities, and in removing carbonized particles from non-carbonaceous impurities of the coal, and in then introducing the carbonized particles and the partially reduced ore to a retort for combustion of the carbonized particles in a reducing atmosphere to reduce the ore to metal.

10. The process of treating iron ore mixed with pulverized coal, which consists in subjecting the aggregate to a heat treatment of sufficient temperature to remove volatiles from the coal but at a temperature too low to cause slagging or sintering of the ore, in effecting a separation of the ore from its impurities, and in then mixing the partially treated ore with a carbonaceous fuel to be burned in the presence of the ore to complete its reduction to molten metal.

11. The process of treating iron ore intermixed with comminuted coal, which comprises subjecting the mixed substances to a heat treatment of relatively low temperature sufficient to distill the volatile products from the coal and to partially reduce the ore without slagging the same, in separating the ore from impurities, and removing the carbonized particles from non-carbonaceous matter, and in then smelting the partially reduced ore with the carbonized particles.

12. The process of treating ores in a fine state of division associated with pulverized fuel containing carbon substantially free of hydrocarbon, which comprises burning the fuel in the presence of the ore to reduce the ore to molten metal.

13. The process of treating finely pulverized ores mixed with finely divided carbonaceous material, which consists in subjecting the aggregate to a low temperature heat treatment sufficient to distill the volatile products from the carbonaceous material without slagging or sintering the ore in separating the ore from impurities, and in then reducing the ore to metal by burning the treated carbonaceous fuel free of hydrocarbons in the presence of the ore.

14. The process of treating ore mixed with a carbonaceous fuel, which consists in subjecting the aggregate when in such a fine state of division as to detach impurities from the fuel and ore to a heat treatment sufficient to distill volatile products from the coal without slagging or sintering the ore, in effecting a separation of the ore from its impurities, in removing carbonized particles from non-carbonaceous matter, and in then burning the carbonized particles in the presence of the ore to completely reduce the ore to molten metal.

15. The process of treating ore mixed with carbonaceous fuel, which consists in subjecting the mixed ore and fuel when in such a fine comminuted form as to detach impurities from the ore and the carbonaceous content of the fuel to a heat treatment of such a temperature as to remove volatiles from the carbonaceous matter, but of a temperature too low to cause slagging or sintering of the ore, in separating impurities from the ore, in removing carbonized particles from noncombustible matter, and in finally burning the carbonized particles in the presence of the ore to effect a complete reduction of the ore to molten metal.

16. The process of treating ores, which comprises subjecting finely pulverized ore to a heat treatment to partially reduce the ore, in separating the ore from its impurities and in then mixing the ore with a finely comminuted carbonaceous material to be burned in the presence thereof to reduce the same to metal.

17. The process of treating ores, which consists in subjecting finely comminuted ores to a low temperature heat treatment, sufficient to partially reduce the ore without slagging the same, in separating the ore from its impurities after such partial reduction, and in then mixing the ore with a finely divided carbonaceous fuel substantially free of hydrocarbon to be burned in the presence of the ore to complete the reduction thereof.

18. The process of reducing ores, which comprises mixing finely divided carbonaceous particles and ore, in subjecting the mixed substances to a heat treatment to remove volatiles from the carbonaceous particles and to partially reduce the ore, in separating the ore from its impurities, and in then mixing the ore with the carbonized particles substantially freed of their hydrocarbons, which particles are burned in the presence of the ore to complete the reduction thereof.

In testimony whereof I affix my signature.

WALTER EDWIN TRENT.